United States Patent
Zaikov

(10) Patent No.: US 9,339,995 B2
(45) Date of Patent: May 17, 2016

(54) MULTI-LAYERED SHRINK FILM WITH POLYOLEFIN CORE

(71) Applicant: Avery Dennison Corporation, Pasadena, CA (US)

(72) Inventor: Vadim Zaikov, Perry, OH (US)

(73) Assignee: Avery Dennison Corporation, Glendale, CA (US)

( * ) Notice: Subject to any disclaimer, the term of this patent is extended or adjusted under 35 U.S.C. 154(b) by 18 days.

(21) Appl. No.: 13/650,539

(22) Filed: Oct. 12, 2012

(65) Prior Publication Data
US 2013/0177802 A1 Jul. 11, 2013

Related U.S. Application Data

(60) Provisional application No. 61/585,442, filed on Jan. 11, 2012.

(51) Int. Cl.
*H01M 2/04* (2006.01)
*B32B 27/32* (2006.01)
*B65D 71/52* (2006.01)
*B65D 71/08* (2006.01)

(52) U.S. Cl.
CPC ............ *B32B 27/32* (2013.01); *B65D 71/0003* (2013.01); *B65D 71/08* (2013.01); *B32B 2250/03* (2013.01); *B32B 2250/242* (2013.01); *B32B 2250/40* (2013.01); *B32B 2307/736* (2013.01); *Y10T 428/2848* (2015.01); *Y10T 428/31797* (2015.04); *Y10T 428/31913* (2015.04); *Y10T 428/31938* (2015.04)

(58) Field of Classification Search
None
See application file for complete search history.

(56) References Cited

U.S. PATENT DOCUMENTS

| | | |
|---|---|---|
| 3,113,986 A | 12/1963 | Breslow et al. |
| 3,239,478 A | 3/1966 | Harlan, Jr. |
| 3,251,905 A | 5/1966 | Zelinski |
| 3,390,207 A | 6/1968 | Moss et al. |
| 3,598,887 A | 8/1971 | Darcy et al. |
| 3,639,521 A | 2/1972 | Hsieh |
| 4,208,356 A | 6/1980 | Fukawa et al. |
| 4,219,627 A | 8/1980 | Halasa et al. |

(Continued)

FOREIGN PATENT DOCUMENTS

| | | |
|---|---|---|
| CN | 1578805 | 2/2005 |
| CN | 101084116 | 12/2007 |

(Continued)

OTHER PUBLICATIONS

International Search Report and Written Opinion dated Dec. 7, 2012 for International Application No. PCT/US2012/059896 filed Oct. 12, 2012.

(Continued)

*Primary Examiner* — Patrick Ryan
*Assistant Examiner* — Jose Colucci Rios
(74) *Attorney, Agent, or Firm* — Avery Dennison Corporation

(57) ABSTRACT

A heat shrink film comprising a core layer having an upper and lower surface and comprising a blend of (A) less than 40% of an alpha-olefin copolymer that is a copolymer of ethylene or propylene with an alpha-olefin and (B) a polyolefin copolymer, and (C) an olefin homopolymer; a skin layer on the upper surface of the core layer; and a skin layer on the lower surface of the core layer. The film exhibits excellent shrinkage and is suitable as a shrink film to encapsulate a wide variety of articles including, for example, batteries.

23 Claims, 1 Drawing Sheet

(56) References Cited

U.S. PATENT DOCUMENTS

| | | | |
|---|---|---|---|
| 4,226,952 A | 10/1980 | Halasa et al. | |
| 4,375,494 A | 3/1983 | Stokes | |
| 5,164,444 A | 11/1992 | Bernard | |
| 5,190,609 A | 3/1993 | Lin et al. | |
| 5,232,958 A | 8/1993 | Mallya et al. | |
| 5,264,532 A | 11/1993 | Bernard | |
| 5,292,566 A * | 3/1994 | Shacklett, III | 428/40.9 |
| 5,358,804 A | 10/1994 | Will et al. | |
| 5,435,936 A | 7/1995 | Broze | |
| 5,460,861 A * | 10/1995 | Vicik et al. | 428/34.9 |
| 5,534,570 A | 7/1996 | Shih et al. | |
| 5,623,011 A | 4/1997 | Bernard | |
| 5,705,551 A | 1/1998 | Sasaki et al. | |
| 5,709,937 A | 1/1998 | Adams et al. | |
| 5,741,563 A | 4/1998 | Mehta et al. | |
| 5,859,116 A | 1/1999 | Shih | |
| 6,306,982 B1 | 10/2001 | Lee et al. | |
| 6,362,306 B1 | 3/2002 | Shelby et al. | |
| 6,436,496 B1 | 8/2002 | Rackovan et al. | |
| 6,514,583 B1 | 2/2003 | Ahlgren et al. | |
| 2002/0098303 A1 * | 7/2002 | Rackovan et al. | 428/34.9 |
| 2002/0186120 A1 | 12/2002 | Tamura et al. | |
| 2003/0068453 A1 | 4/2003 | Kong | |
| 2003/0088033 A1 | 5/2003 | Shelby et al. | |
| 2003/0165671 A1 | 9/2003 | Hashimoto et al. | |
| 2003/0170427 A1 | 9/2003 | Ito et al. | |
| 2005/0010018 A1 | 1/2005 | Kim et al. | |
| 2005/0106342 A1 | 5/2005 | Dawes et al. | |
| 2005/0199359 A1 | 9/2005 | Furuheim | |
| 2006/0019112 A1 * | 1/2006 | Holmes et al. | 428/500 |
| 2006/0063008 A1 | 3/2006 | Inagaki et al. | |
| 2006/0121219 A1 | 6/2006 | Shelby et al. | |
| 2007/0099017 A1 | 5/2007 | Hayakawa et al. | |
| 2007/0196600 A1 | 8/2007 | Hutchinson et al. | |
| 2008/0050651 A1 * | 2/2008 | Wakai et al. | 429/185 |
| 2009/0042024 A1 | 2/2009 | Fujii et al. | |
| 2009/0068486 A1 * | 3/2009 | Blackwell et al. | 428/516 |
| 2010/0068355 A1 | 3/2010 | Berry et al. | |
| 2010/0112263 A1 | 5/2010 | Lorence et al. | |
| 2010/0227136 A1 | 9/2010 | Ramli et al. | |
| 2011/0039151 A1 * | 2/2011 | Mitchell | 429/164 |
| 2011/0154699 A1 | 6/2011 | Walsh et al. | |
| 2013/0177802 A1 | 7/2013 | Zaikov | |
| 2014/0299254 A1 | 10/2014 | Rackovan et al. | |

FOREIGN PATENT DOCUMENTS

| | | |
|---|---|---|
| JP | 3045631 | 2/1991 |
| WO | 0027631 | 5/2000 |
| WO | 0112697 | 2/2001 |
| WO | 2006/071826 | 7/2006 |
| WO | 2010047906 | 4/2010 |

OTHER PUBLICATIONS

International Preliminary Report on Patentability dated Apr. 15, 2014 for International Application No. PCT/US2012/059896 filed Oct. 12, 2012.

International Search Report dated Jan. 15, 2013 for International Application No. PCT/US2012/059901 filed Oct. 12, 2012.

Written Opinion dated Jul. 11, 2014 for International Application No. PCT/US2012/059901 filed Oct. 12, 2012.

International Preliminary Report on Patentability dated Jul. 15, 2014 for International Application No. PCT/US2012/059901 filed Oct. 12, 2012.

Whelan, Polymer Technology Disctionary, 1994, p. 566.

* cited by examiner

MULTI-LAYERED SHRINK FILM WITH POLYOLEFIN CORE

RELATED APPLICATION

The present application claims the benefit of U.S. Provisional Application 61/585,442 filed on Jan. 11, 2012 and titled "Multi-Layered Shrink Film With Polyolefin Core," the entire disclosure of which is incorporated herein by reference.

TECHNICAL FIELD OF THE INVENTION

This invention relates to halogen-free multilayered shrink films. More specifically, the invention relates to halogen-free multilayered shrink films that are useful in encapsulating cylindrical articles, such as batteries.

BACKGROUND OF THE INVENTION

Shrink film has been used for years to encapsulate articles. The shrink film must be able to shrink sufficiently to provide a smooth consistent coating. Previously, shrink films have been polyolefins and polyolefin blends which were and are used extensively in the food and packaging business to protect and preserve articles, such as food. One problem with polyolefin and polyolefin film blends is the difficulty of printing on the film. For printing to be successful, the films must provide a surface that will accept printing. Additionally the films must have sufficient tensile modulus to withstand the rigors of the printing process. Many polyolefin shrink films do not have the tensile strength to withstand gravure printing.

Shrink film has also been used for encapsulating cylindrical articles such as batteries. Polyvinyl chloride (PVC) films provide acceptable shrinkages of about 40%. However, PVC shrink films have a problem with heat stability. After forming the shrink film, the film should not shrink prematurely. Often, after formation, the film may be exposed to elevated temperatures, such as in transport. Another problem with PVC shrink films is recent concerns over the environmental impact of PVC film. Concern regarding potentially the adverse effect of halogens on the ozone layer has lead to efforts to provide halogen free shrink films.

Batteries are typically encapsulated by shrink films. The film must shrink sufficiently to encase the battery. A problem with encapsulating batteries and any other cylindrical article is end puckering. End puckering occurs when the shrink film does not shrink sufficiently to provide a smooth encapsulating film at the ends of the battery or the article being encapsulate, and the film folds over itself and forms a "pucker." This puckering is unacceptable to consumers and therefore the manufacturer.

Battery encapsulating is done at very high speeds. The speed of the labeling is often more that 700 labels applied per minute. It is difficult for typical shrink film labels to work under such high speed conditions.

SUMMARY OF THE INVENTION

The present invention provides multilayered a heat shrink film comprising a core layer having an upper and lower surface and comprising a blend of (A) less than 40% of an alpha-olefin copolymer that is a copolymer of ethylene or propylene with an alpha-olefin and (B) a polyolefin copolymer, and (C) an olefin homopolymer; a skin layer on the upper surface of the core layer; and a skin layer on the lower surface of the core layer. The film exhibits excellent shrinkage and is suitable as a shrink film to encapsulate a wide variety of articles including, for example, batteries.

In one aspect, the present invention provides heat shrink label comprising a core layer having an upper surface and a lower surface, the core comprising a blend of (A) about 35% or less of an alpha-olefin copolymer comprising a copolymer of a ethylene or propylene and an alpha-olefin; (B) about 60% or more of a polyolefin; and (C) the balance being an olefin homopolymer; a first skin layer disposed about the upper surface of the core layer; and a second skin layer disposed about the lower surface of the core layer.

The film may have a shrinkage of at least about 30%. The films have good shrinkage and avoid end puckering. Additionally, the films are printable, even with gravure printing.

DETAILED DESCRIPTION OF THE INVENTION

The present invention provides multilayer shrink films and labels produced therefrom. The films and labels may exhibit a shrinkage of greater than 30% and are suitable to encapsulate a wide range of articles including, but not limited to batteries.

Figure 1:
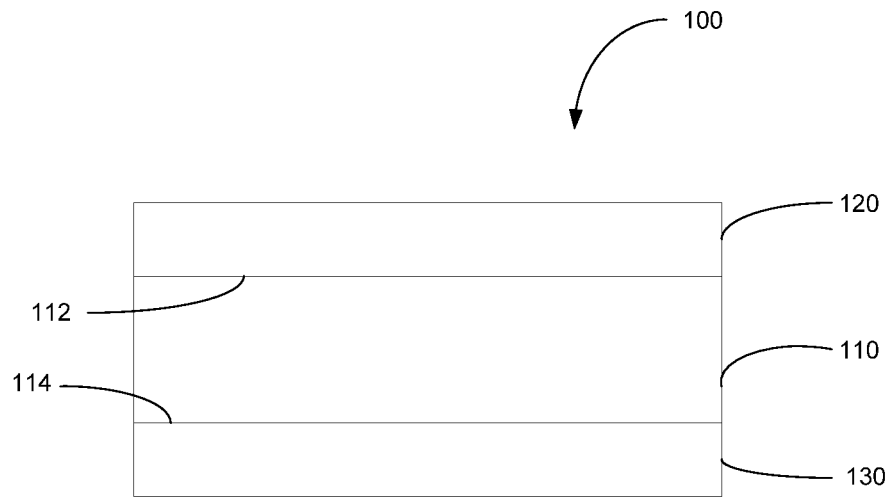
FIG. 1 is a cross-sectional view of a label in accordance with an embodiment of the present invention.

In accordance with aspects of the present invention, a multilayer shrink film comprises a core layer and skin layers disposed on opposing surfaces of the core layer. The shrink film may comprise additional layers as may be desired including tie layers, adhesive layers, etc. As shown in FIG. 1, a shrink film 100 in accordance with one embodiment of the present invention may comprise a core layer 110 having an upper surface 112 and a lower surface 114, a first skin layer 120 overlying the upper surface of the core layer and a second skin layer 130 overlying the lower surface.

Figure 2:
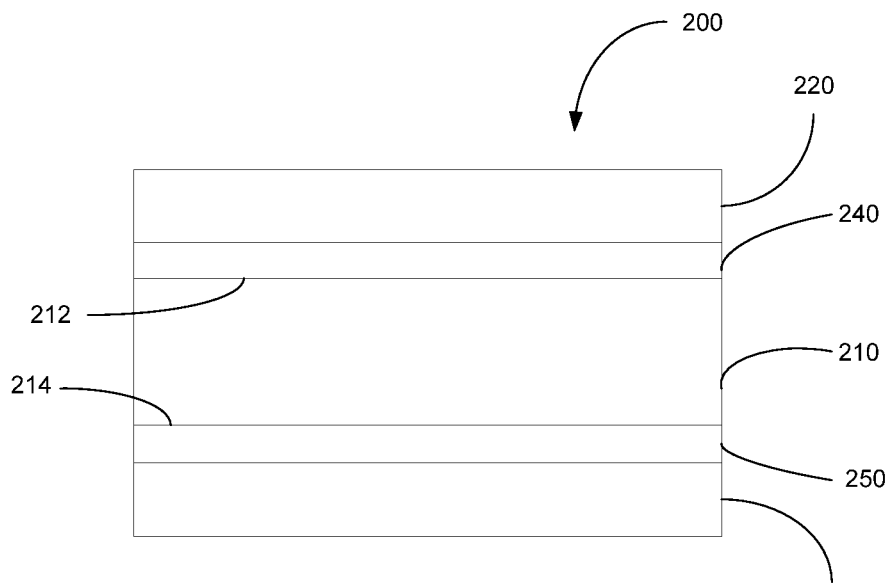
FIG. 2 is a cross-sectional view of a label in accordance with an embodiment of the present invention.

FIG. 2 illustrates another embodiment of a shrink film in accordance with aspects of the invention. Shrink film 200 comprises a core layer 210 having an upper surface 212 and a lower surface 214. The film includes a skin layer 220 overlying the upper surface 212 and a skin layer 230 overlying the lower surface 214 of the core layer. Shrink film 200 further includes a tie layer 240 disposed between the skin layer 220 and the core layer 210, and a tie layer 250 disposed between the skin layer 230 and the core layer 210. It will be appreciated that a shrink film need not include a tie layer between the core layer and each of the respective skin layers. For example, the shrink film may not have any tie layers (as in FIG. 1), one tie layer (e.g., either tie layer 240 or 250) between one of the skin layers and the core layer, or a tie layer between each of the skin layers (as illustrated in FIG. 2).

Core layer

The core layer comprises a blend of (A) an alpha-olefin copolymer comprising a copolymer of ethylene or propylene with an alpha-olefin, (B) a polyolefin copolymer, and (C) an olefin homopolymer. In one aspect, the blend comprises less than 35% by weight of the alpha-olefin copolymer, at least about 60% by weight of the polyolefin copolymer, and the balance being an olefin homopolymer. Applicant has found that excellent shrinkage can be obtained even when the alpha-olefin copolymer is less than 40% by weight of the core layer.

The alpha-olefin copolymer comprises at least one copolymer of ethylene or propylene with an alpha-olefin. The copolymers generally have a melt flow of about 2 to about 8, or from about 3 to about 5 g/10 min. The alpha-olefin may be linear or branched. In one embodiment, the alpha-olefin is chosen from a $C_3$-$C_{12}$ alpha-olefin. In another embodiment, the alpha-olefin is chosen from a $C_4$-$C_8$ alpha-olefin. Suitable alpha olefins include, but are not limited to, 1-butene, 1-pentene, 1-hexene, 1-heptene, 1-octene, etc., and combinations of two or more thereof. In one embodiment, the alpha-olefin is chosen from 1-butene, 1-hexene, or a combination thereof.

The alpha-olefin copolymer may be obtained by any suitable method including by copolymerization of ethylene or propylene with an alpha olefin, such as 1-butene, using single-site metallocene catalysts. Non-limiting examples of suitable alpha-olefin copolymers include those available from Mitsui Chemicals under the tradename Tafiner™.

The core layer further comprises a polyolefin copolymer. The polyolefin copolymer may be a copolymer comprising at least two olefins having from 2 to about 16, or from 3 to about 12, or from about 4 to about 8 carbon atoms. The olefins include ethylene, propylene, butylene, pentene, hexene, heptene, octene, nonene, decene, etc. The polyolefins typically have a melt flow from about 2 to about 10, or from about 3 to about 8, or from about 4 to about 6 g/10 min.

In one embodiment, the polyolefin copolymer is a propylene-ethylene or a butylene-ethylene copolymer. In one embodiment, the polyolefin copolymer is a propylene-ethylene copolymer containing up to about 10% or less of ethylene and more often less than about 6% ethylenic content. Ethylenic contents of from about 0.2% to about 10% are useful. In one embodiment, the ethylene content is from about 3% to about 10% by weight. In another embodiment, the ethylene content is from about 3% to about 6% by weight. Examples of suitable propylene copolymers include, but are not limited to, those available from Braskem. When the polyolefin copolymer is a butylene copolymer, it typically includes ethylene at a level of about 0.5% to about 12%, or of about 1% to about 10%, or from about 1.5% to about 8%. Examples of useful butylene-ethylene copolymers are available from Lyondell-Basell as DP 8220, having an ethylene content of 2% and a melt flow of 2.0 g/10 min, and DP 8310, having an ethylene content of 6% and a melt flow of 3.2 g/10 min.

The core layer may further comprise a polyolefin homopolymer such as a propylene or butylene homopolymer. A non-limiting example of a suitable propylene homopolymers include those available from Baskem. Non-limiting examples of a butylene homopolymers include those available from Shell Chemical Company including, for example, those identified as 0300 (melt flow of 4.0 g/10 min).

In one embodiment, the core layer comprises from about 5% to about 35% by weight of the alpha-olefin copolymer, from about 60% to about 90% by weight of the polyolefin copolymer, and from about 0.1 to about 30% by weight of the olefin homopolymer. In one embodiment, the core layer is free of an ethylene homopolymer.

It has been found that a shrink film with excellent shrink properties may be obtained even with an alpha-olefin copolymer content of less than 40% by weight of the core layer composition. In one embodiment, the core layer comprises about 35% by weight or less of the alpha-olefin copolymer, about 60% or greater of the polyolefin copolymer, and the balance is the olefin homopolymer.

Skin Layers

The multilayer shrink film has a first skin layer overlaying the upper surface of the core layer and a second skin layer overlying the lower surface of the core layer. The skin layer composition is not particularly limited and may be chosen from a variety of materials. Desirably, the skins exhibit a shrink rate similar to that of the core. In embodiments of the invention, the skin layers comprise at least one thermoplastic polymer; at least one polyolefin; at least two polyolefins; at least two alpha-olefin polymers comprising alpha-olefin homopolymers, alpha-olefin copolymers, or mixtures of alpha-olefin homopolymers and alpha-olefin copolymers; a polyester; a glycol modified polyesters; or a combination of two or more thereof.

In one embodiment, at least one skin layer is a comprises at least one alpha-olefin copolymer. In another embodiment, the film comprises two skin layers where each of the skin layers independently comprises at least one alpha-olefin copolymer, at least one alpha-olefin copolymer and at least one alpha-olefin homopolymer, at least two alpha-olefin copolymers, or at least two alpha-olefin copolymers and at least one alpha-olefin homopolymer. The alpha-olefin homopolymers and copolymers may comprise isotactic polypropylene homopolymers that can be nucleated, polyethylene homopolymers having an ASTM D1238 melt index of 1-10 g/10 minutes, polypropylene copolymers that can be nucleated such as, for example, propylene-ethylene copolymers and polyethylene copolymers. Useful alpha-olefin polymers for the skins include the nucleated isotactic polypropylene homopolymers P4GK-173X from Flint Hills Resources, polypropylene copolymers such as the nucleated propylene-ethylene copolymer P5M4K-070X from Flint Hills Resources, and the very low density polyethylene copolymer Affinity KC8852 from Dow which is an ethylene-1-octene copolymer prepared by metallocene catalysis. The alpha-olefin copolymers can be present in the skin layers on a weight basis from about 10% to about 50%, or about 15% to about 45%, or about 20% to about 40%, or about 30% to about 35%. The alpha-olefin homopolymers can be present in the skin layers on a weight basis up to 90%, or 80%, or 70%. Here as elsewhere in the specification and claims, numerical values may be combined to form new or nondisclosed ranges.

In one embodiment, the skin layers may comprise a polyolefin blend. In one embodiment, the polyolefin blend is a blend comprising a blend of (A) an alpha-olefin copolymer comprising a copolymer of ethylene or propylene with an alpha-olefin, (B) a polyolefin copolymer, and (C) an olefin homopolymer. Such blends are described above with respect to the core layer.

In another embodiment, the skin layer comprises a polyolefin blend comprising a major amount of one or more olefin homopolymers and a minor amount of one or more copolymers of ethylene or propylene with an alpha-olefin. In one embodiment, the olefin homopolymer is present in an amount from about 55% to about 95%, or from about 60% to about 85%, or from about 80% by weight of the polymers of the skin layer. The olefin copolymers make up the balance of the skin layer. In one embodiment, the skin layer is free of ethylene homopolymers. In another embodiment, the skin layer is free of ethylene propylene copolymers.

In one embodiment, the skin layers may comprise a thermoplastic copolymer or terpolymer derived from ethylene or propylene and a functional monomer chosen from, for example, an alkyl acrylate, an acrylic acid, an alkyl acrylic acid, a vinyl acetate, or a combination of two or more thereof. In one embodiment, the functional monomer is chosen from an alkyl acrylate, an acrylic acid, an alkyl acrylic acid, or a combination of two ore more thereof. The alkyl groups in the alkyl acrylates and the alkyl acrylic acids may contain, for example, 1 to about 8 carbon atoms, and in one embodiment 1 to about 2 carbon atoms. The functional monomer(s) component of the copolymer or terpolymer may range from about 1 to about 15 mole percent, and in one embodiment about 1 to about 10 mole percent of the copolymer or terpolymer molecule. Non-limiting examples of suitable functionalized thermoplastic polymers include ethylene/vinyl acetate copolymers; ethylene/methyl acrylate copolymers; ethylene/ethylacrylate copolymers; ethylene/butyl acrylate copolymers; ethylene/methacrylic acid copolymers; ethylene/acrylic acid copolymers; ethylene/methacrylic acid copolymers containing sodium or zinc (also referred to as ionomers); acid-, anhydride- or acrylate-modified ethylene/vinyl acetate copolymers; acid- or anhydride-modified ethylene/acrylate copolymers; anhydride-modified low density polyethylenes; anhydride-modified linear low density polyethylene, or a combination of two or more thereof. Non-limiting examples of suitable ethylene/vinyl acetate copolymers include those with a vinyl acetate content of at least about 10% by weight, and in one embodiment about 18% to about 25% by weight. Examples of commercially available copolymers and terpolymers that can be used include, but are not limited to, the ethylene/vinyl acetate copolymers available from Celanese under the tradename EVA 1821. These copolymers and terpolymers may be present in the skin layers 120 and 130 at concentrations of up to about 50% by weight, and in one embodiment about 10 to about 35% by weight, and in one embodiment about 50% by weight. In embodiments employing an ionomer in the skin layer, the film construction should generally include a tie layer.

In one embodiment, the skin layers may comprise a glycol modified polyester. Such embodiments should also comprise a tie layer as part of the film construction. The glycol modified polyester material may comprise a polymer made by polymerization of a dicarboxylic acid with (1) a difunctional alcohol monomer other than ethylene glycol, or (2) two or more difunctional alcohol monomers, one of which may be ethylene glycol. In one embodiment, a glycol modified polyester may comprise a polymer made by polymerization of a dicarboxylic acid with a two or more difunctional alcohols, at least one of which is ethylene glycol.

The difunctional carboxylic acid may be an aromatic dicarboxylic acid. Examples of aromatic dicarboxylic acids suitable for use in the modified polyester resin include, but are not limited to, terephthalic acid, isophthalic acid, phthalic acid, 2,5-dimethylterephthalic acid, 5-t-butylisophthalic acid, 4,4'-biphenyldicarboxylic acid, trans-3,3'-stilbenedicarboxylic acid, trans-4,4'-stilbenedicarboxylic acid, 4,4'-dibenzyldicarboxylic acid, 1,4-naphthalenedicarboxylic acid, 1,5-naphthalenedicarboxylic acid, 2,3-naphthalenedicarboxylic acid, 2,6-naphthalenedicarboxylic acid, 2,7-naphthalenedicarboxylic acid, 2,2,6,6-tetramethylbiphenyl-4,4'-dicarboxylic acid, 1,1,3-trimethyl-3-phenylindene-4,5-dicarboxylic acid, 1,2-diphenoxyethane-4,4'-dicarboxylic acid, diphenyl ether dicarboxylic acid, 2,5-anthracenedicarboxylic acid, 2,5-pyridinedicarboxylic acid, derivatives thereof, or a combination of two or more thereof. In one embodiment, the aromatic dicarboxylic acid component is terephthalic acid.

The glycol modified polyester resin for use herein may also contain one or more aliphatic or alicyclic difunctional dicarboxylic acids as copolymerization components. Non-limiting examples of suitable aliphatic dicarboxylic acid components include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, heptadecanedioic acid, octadecanedioic acid, nonadecanedioic acid, icosanedioic acid, docosanedioic acid, 1,12-dodecanedionoic acid, and derivatives of thereof. Non-limiting examples of suitable alicyclic dicarboxylic acid components include 1,3-cyclopentanedicarboxylic acid, 1,2-cyclohexanedicarboxylic acid, 1,3-cyclohexanedicarboxylic acid, 1,4-cyclohexanedicarboxylic acid, 1,4-decahydronaphthalenedicarboxylic acid, 1,5-decahydronaphthalenedicarboxylic acid, 2,6-decahydronaphthalenedicarboxylic acid, and substitution derivatives of them. It will be appreciated that the copolymerization components can be used alone or in combination.

As previously described, a glycol modified polyester comprises a component derived from a difunctional alcohol. In one embodiment, a glycol modified polyester comprises a component derived from a single type of difunctional alcohol other than ethylene glycol. In another embodiment, a glycol modified polyester comprises components derived from two or more difunctional alcohols where one of the two or more monomers may be ethylene glycol.

The difunctional alcohols used to form the glycol modified polyester may include, for example, aliphatic diols, alicyclic diols, aromatic diols, or combinations of two or more thereof. Non-limiting examples of suitable aliphatic diols include ethylene glycol (when used in conjunction with at least one of the difunctional alcohol), diethylene glycol, 1,2-propanediol, 1,3-propanediol, 1,3-butanediol, 1,4-butanediol, 1,5-pentanediol, 2,2-dimethyl-1,3-propanediol (neopentyl glycol), 1,6-hexanediol, 2-ethyl-2-methyl-1,3-propanediol, 2,2-diethyl-1,3-propanediol, 1,8-octanediol, 2-ethyl-2-butyl-1,3-propanediol, 2-ethyl-2,4-dimethyl-1,3-hexanediol, 1,10-decanediol, polyethylene glycol, and polypropylene glycol. Non-limiting examples of suitable alicyclic diols include 1,2-cyclohexanedimethanol, 1,3-cyclohexanedimethanol, 1,4-cyclohexanedimethanol, and 2,2,4,4-tetra methyl-1,3-cyclobutanediol.

In one embodiment, the modified polyester comprises 50 mole % of the difunctional alcohol and 50 mole % of the dicarboxylic acid, i.e., a 1:1 mole ratio of difunctional alcohol to dicarboxylic acid. In embodiments, where the glycol modified polyester is derived from more then one difunctional alcohol, the total mole percent of difunctional alcohol is 50%, and the percent of each difunctional alcohol may be selected as desired for a particular purpose or intended use including to adjust the properties of the glycol modified polyester. In one embodiment, the glycol modified polyester is derived from a first difunctional alcohol in an amount of 0.1 to 49.9 mole % and a second difunctional alcohol in an amount of 49.9 to 0.1 mole %. In one embodiment, the glycol modified polyester is derived from a first difunctional alcohol in an amount of 1 to 49 mole % and a second difunctional alcohol in an amount of 49 to 1 mole %. In one embodiment, the glycol modified polyester is derived from a first difunctional alcohol in an amount of 5 to 45 mole % and a second difunctional alcohol in an amount of 45 to 5 mole %. In one embodiment, the glycol modified polyester is derived from a first difunctional alcohol in an amount of 10 to 40 mole % and a second difunctional alcohol in an amount of 40 to 10 mole %. In one embodiment, the glycol modified polyester is derived from a first difunctional alcohol in an amount of 25 mole % and a second difunctional alcohol in an amount of 25 mole %. It will be appreciated that a glycol modified polyester is not limited to such embodiments and may comprise more than two difunctional alcohol components to provide a total difunctional alcohol content of 50 mole %. Here as elsewhere in the specification and claims, numerical values may be combined to create new or non-disclosed ranges.

In one embodiment, the modified polyester is a glycol modified polyethylene terephthalate (PETG). A glycol modified polyethylene terephthalate may be made by condensing terephthalic acid with a difunctional alcohol other than ethylene glycol, or two or more types of difunctional alcohols (where one of the two or more difunctional alcohols may be ethylene glycol). In one embodiment, a PETG is made by condensing terephthalic acid with ethylene glycol and cyclohexane dimethanol. In another embodiment, the glycol modified polyester employs a dimethyl terephthalic acid.

Examples of suitable materials for the modified PETG include, but are not limited to, modified PETG resins available from Eastman including those sold under the trade names EASTAR, Eastman SPECTAR, and Eastman EMBRACE.

The skin layers may further comprise an additional thermoplastic polymeric material. This polymeric material may be a polystyrene, rubber modified polystryene, acrylonitrile butadiene styrene (ABS), polyester, cylic olefin copolymer, and mixtures of two or more thereof. An example of a commercially available material that may be used is Dow 5A97. Another example is Equistar H6012 which is identified as a high density polyethylene. This polymeric material may be present in the layers 120 and 130 at a concentration of about 25 to about 100 percent by weight, and in one embodiment about 60 to about 95 percent by weight.

The skin layers may have the same or different compositions. Compositions may be considered different where they contain the same chemical components but differ in the concentrations of those respective components.

Additionally, the skin layers may be configured to be printable to print indicia or other desired markings on the film. The skin layers may be made printable by incorporating any suitable additives that may enhance the printability of the skin layer. Skin layers made from polyolefin compositions may be corona or flame treated to enhance the printability of such skin layers.

Tie Layers

As previously described, a heat shrinkable multilayer film may comprise at least one tie layer. The multilayer film can have a skin layer or skin layers in direct contact with a core layer (e.g., FIG. 1), a tie layer between a skin layer and a core layer, or a tie layer between each skin layer and a core layer (e.g., FIG. 2), wherein tie layers function to improve adhesion of the film layers.

The tie layers may comprise any polymer that improves adhesion of a core layer and a skin layer. Examples of suitable tie layers include, but are not limited to, polyethylene copolymers including, for example, ethylene-alpha-olefin copolymers having a high alpha-olefin comonomer content; alkene-unsaturated carboxylic acid or carboxylic acid derivative copolymers such as, for example, ethylene-methacrylic acid copolymers and ethylene-vinyl acetate copolymers and ionomers such as zinc salts of ethylene-methacrylic acid copolymers, unsaturated dicarboxylic acid anhydride grafted polymers and copolymers such as maleic anhydride grafted ethylene-vinyl acetate copolymers and maleic anhydride grafted polyethylenes, styrene-butadiene copolymers, $C_3$ or higher alpha-olefin copolymers having a high alpha-olefin comonomer content such as, for example, a propylene-1-butene copolymer having a 1-butene content up to 14% by weight. Examples of suitable tie layers include Platamid available from Arkema, Plexar available from Lyondell-Basell, and CXA or Bynel tie layers available from DuPont Chemical.

The tie layers may be comprised of one or more adhesive materials optionally in combination with one or more additional film forming thermoplastic polymeric materials. Suitable adhesive materials include, but are not limited to, ethylene vinyl acetate copolymers, ethylene methyl acrylate copolymers and ethylene butyl acrylate copolymers. An example of a commercially available material that can be used is the ethylene methyl acrylate copolymer available from ExxonMobil under the trade designation Optema TC 120. This material is identified as having a methyl acrylate content of 21.5% by weight, a density of 0.942 g/cc, and a melt index of 6.0 g/10 min. Another example is EVA 1821 available from Celanese. Other suitable film forming thermoplastic polymeric materials that can be used include, but are not limited to, polypropylene, copolymers of ethylene and propylene, medium density polyethylene (density of about 0.924 to about 0.939 g/cc), terpolymers of ethylene, vinyl acetate and malic anhydride, and terpolymers of ethylene, vinyl acetate and acrylic acid. An example of a commercial thermoplastic polymeric material that may be used is Dow 5A97. The weight ratio of adhesive material to additional film forming thermoplastic polymeric material may range from about 10:90 to about 100:0, and in one embodiment about 40:60 to about 70:30, and in one embodiment about 50:50.

Additives

The heat shrinkable film can comprise one or more additives to enhance the manufacture and processing of the film and/or the service performance of the film. The monolayer film or each of the layers of the multilayer film can comprise at least one additive. Suitable additives may include, but are not limited to, antiblocking agents, processing aids, nucleating agents, fillers, colorants to include pigments and dyes, antistatic agents, antioxidants, slip agents, ultraviolet stabilizers, and mixtures of two or more of any of the foregoing additives. The additives can be introduced to the film or film layers as a component of a film polymer wherein the additive is blended with a film polymer such as, for example, a nucleated polypropylene polymer which is a blend of the polymer and a nucleating agent or as an additive concentrate where the additive concentrate comprises the additive and a carrier resin such as, for example, antiblocking agents and processing aids. The skin and core layers can comprise nucleating agents to enhance film stiffness and clarity. The skin layers can comprise surface active additives to facilitate manufacture and processing to include antiblocking agents, processing agents and antistatic agents. Nucleating agents are generally a component of a film polymer such as a nucleated polypropylene film polymer as described hereinabove. Useful antiblocking agents include the antiblock concentrates Ampacet 401960 (Seablock-4) and ABPP05-SC from A. Schulman. Useful processing aids include the processing aid concentrate Ampacet 401198. Each of the additives can be present in the film or a layer of the film on a weight basis of about 0.005% to about 20%, or about 0.01% to about 15%, or about 0.02% to about 10%.

Adhesives

Optionally, the shrink film may include an adhesive disposed on an outer surface of the film (e.g., on an outer surface of one of the skin layers). A description of useful pressure sensitive adhesives may be found in Encyclopedia of Polymer Science and Engineering, Vol. 13, Wiley-Interscience Publishers (New York, 1988). Additional description of useful PSAs may be found in Polymer Science and Technology, Vol. 1, Interscience Publishers (New York, 1964). Conventional PSAs, including acrylic-based PSAs, rubber-based PSAs and silicone-based PSAs are useful. The PSA may be a solvent based or may be a water based adhesive. Hot melt adhesives may also be used. In one embodiment, the PSA comprises an acrylic emulsion adhesive.

The adhesive and the side of the film to which the adhesive is applied have sufficient compatibility to enable good adhesive anchorage. The adhesive can also be chosen so that the adhesive components do not migrate into the film.

In one embodiment, the adhesive may be formed from an acrylic based polymer. It is contemplated that any acrylic based polymer capable of forming an adhesive layer with sufficient tack to adhere to a substrate may function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure-sensitive adhesive might be formed from a single polymeric species.

The glass transition temperature of a PSA layer comprising acrylic polymers can be varied by adjusting the amount of polar, or "hard monomers", in the copolymer, as taught by U.S. Pat. No. 5,264,532, incorporated herein by reference. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

The PSA can be acrylic based such as those taught in U.S. Pat. No. 5,164,444 (acrylic emulsion), U.S. Pat. No. 5,623, 011 (tackified acrylic emulsion) and U.S. Pat. No. 6,306,982. The adhesive can also be rubber-based such as those taught in U.S. Pat. No. 5,705,551 (rubber hot melt). It can also be radiation curable mixture of monomers with initiators and other ingredients such as those taught in U.S. Pat. No. 5,232, 958 (UV cured acrylic) and U.S. Pat. No. 5,232,958 (EB cured). The disclosures of these patents as they relate to acrylic adhesives are hereby incorporated by reference.

Commercially available PSAs are useful in the invention. Examples of these adhesives include the hot melt PSAs available from H.B. Fuller Company, St. Paul, Minn. as HM-1597, HL-2207-X, HL-2115-X, HL-2193-X. Other useful commercially available PSAs include those available from Century Adhesives Corporation, Columbus, Ohio. Another useful acrylic PSA comprises a blend of emulsion polymer particles with dispersion tackifier particles as generally described in Example 2 of U.S. Pat. No. 6,306,982. The polymer is made by emulsion polymerization of 2-ethylhexyl acrylate, vinyl acetate, dioctyl maleate, and acrylic and methacrylic comonomers as described in U.S. Pat. No. 5,164,444 resulting in the latex particle size of about 0.2 microns in weight average diameters and a gel content of about 60%.

A commercial example of a hot melt adhesive is H2187-01, sold by Ato Findley, Inc., of Wauwatusa, Wis. In addition, rubber based block copolymer PSAs described in U.S. Pat. No. 3,239,478 also can be utilized in the adhesive constructions of the present invention, and this patent is hereby incorporated by a reference for its disclosure of such hot melt adhesives that are described more fully below.

In another embodiment, the pressure-sensitive adhesive comprises rubber based elastomer materials containing useful rubber based elastomer materials include linear, branched, grafted, or radial block copolymers represented by the diblock structure A-B, the triblock A-B-A, the radial or coupled structures $(A\text{-}B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons that may be monocyclic or bicyclic in nature. Rubbery materials such as polyisoprene, polybutadiene, and styrene butadiene rubbers may be used to form the rubbery block or segment. Particularly useful rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes that may be utilized include any of those that exhibit elastomeric properties. The block copolymers may be diblock, triblock, multiblock, starblock, polyblock or graftblock copolymers. Throughout this specification, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in Block Copolymers, Science Technology, Dale J. Meier, Ed., Harwood Academic Publishers, 1979, at pages 1-5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0,1,2}$ ... BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598, 887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639, 521; and 4,208,356, the disclosures of which are hereby incorporated by reference.

Conjugated dienes that may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also may be used.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc.

Many of the above-described copolymers of conjugated dienes and vinyl aromatic compounds are commercially available. The number average molecular weight of the block copolymers, prior to hydrogenation, is from about 20,000 to about 500,000, or from about 40,000 to about 300,000.

The average molecular weights of the individual blocks within the copolymers may vary within certain limits. In most instances, the vinyl aromatic block will have a number average molecular weight in the order of about 2000 to about 125,000, or between about 4000 and 60,000. The conjugated diene blocks either before or after hydrogenation will have number average molecular weights in the order of about 10,000 to about 450,000, or from about 35,000 to 150,000.

Also, prior to hydrogenation, the vinyl content of the conjugated diene portion generally is from about 10% to about 80%, or from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Kraton Polymers LLC under the KRATON trade name.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a poly-styrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Kraton Polymers under the general trade designation "Kraton G." One example is Kraton G1652 which is a hydrogenated SBS triblock comprising about 30% by weight of styrene end blocks and a midblock which is a copolymer of ethylene and 1-butene (EB). A lower molecular weight version of G1652 is available under the designation Kraton G1650. Kraton G1651 is another SEBS block copolymer which contains about 33% by weight of styrene. Kraton G1657 is an SEBS diblock copolymer which contains about 13% w styrene. This styrene content is lower than the styrene content in Kraton G1650 and Kraton G1652.

Films and Constructions

The multilayer shrink film comprises a core layer and outer skin layers overlying the opposing surfaces of the core layer. The shrink film may comprise one or more tie layers disposed between one or both skin layers. The shrink film may comprise other layers as may be desired for a particular purpose or intended use disposed between the skin layers and the core layer. Additionally, the shrink film may comprise an adhesive layer on an outer surface of the shrink film (e.g., on an outer surface of a skin layer) to enhance the bonding between an article and the shrink film.

The thickness of the film and the respective core and skin layers may be chosen as desired for a particular purpose or intended use. The film may have a thickness in one embodiment, from about 0.5 to about 10 mils. In another embodiment, the film may have a thickness of from about 1.5 to about 8 mils. In another embodiment, the film may have a thickness of from about 3 to about 5 mils. In one embodiment, the shrink film has a thickness of about 1.5 mils. In another embodiment, the shrink film has a thickness of about 2.0 mils. Here and elsewhere in the specification, individual numerical values can be combined to form additional and/or non-disclosed ranges.

The core layer may comprise a major portion of the shrink film. Typically, the core layer has a thickness from about 0.6 to about 11 mils, or from about 0.8 to about 8, or from about 1 to about 5, or from about 1.2 to about 2.5 mils thick. In one embodiment, the core layer may be about 2 to 20 times as thick as each of the outer layers. Examples of thickness ratios of the core to the skin layers combined include 90:10, 80:20, 70:30 etc. The thickness ratios of the skin layers to the core and then to the outer skin layer are 5-20:90-60:20-5, or 10-15:70-90:15-10. Thickness ratios for the three layered films include 5:90:5, 10:80:10, 15:70:15, 20:60:20, etc. The two skin layers do not have to be of equal thickness.

In one embodiment, the film exhibits a shrinkage of about 30% or greater. In another embodiment, the film exhibits a shrinkage of about 35% or greater. In still another embodiment, the film exhibits a shrinkage of about 40% or greater. The percent shrinkage may be determined at 270° F. by ASTM D 1204.

In one embodiment, the shrink temperature range is from 250 to 270° F. These films may also be oriented in the machine direction, e.g. uniaxially oriented. The film may have a thickness from about 0.5 to about 12, or from about 1 to about 8, or from about 1.5 to about 5 mils. Here and elsewhere in the specification and claims, the range and ratio limits may be combined.

The films have sufficient strength to be printed by flexographic and gravure printing. These films generally have a Young's modulus from about 150,000 to about 500,000, or from about 175,000 to about 400,000, or from about 200,000 to about 300,000 psi. Young's modulus is determined by ASTM D 882. In one embodiment, the core layer is free of vinyl acetate resins.

The multilayer shrink film may be prepared by any suitable method for forming a film including those known to those in the art or later discovered. For example, the film may be prepared by co-extrusion, extrusion coating, lamination, etc. The film can be uniaxially or biaxially oriented. The uniaxially oriented film can be oriented in a machine direction or in a transverse direction. The extruded or coextruded film in several embodiments of the invention can be oriented by stretching it in the machine direction in a one stage or 2 stage stretching or drawing process wherein the draw or stretch ratio can be 1.1-9:1, 2-9:1, 3-7:1, 4-6:1, 1.1-3:1, or 1.1-2:1. The draw or stretching temperature can range from 90-140° C., or 100-135° C., or 105-130° C. In one embodiment, the film is oriented in the machine direction at a draw ratio of 4.6-5.4:1 and a draw temperature of 108-118° C. In another embodiment, the film may be oriented uniaxially in the machine direction only. In one embodiment of the invention, the film is oriented in the machine direction at a draw ratio of 5.5-6.5:1 and a draw temperature of 116-126° C., and in another embodiment this orienting is uniaxial in the machine direction only.

The processes for extruding and orienting films are described in U.S. Pat. No. 5,709,937, issued to Adams et al, and U.S. Pat. No. 5,435,936, issued to Rackovan et al, the disclosures of which are incorporated by reference for these teachings.

The prepared film can be further treated on one surface or both the upper and lower surfaces to enhance performance in terms of printability or adhesion to an adhesive. The treatment can comprise applying a surface coating such as, for example, a lacquer, applying a high energy discharge to include a corona discharge to a surface, applying a flame treatment to a surface, or a combination of any of the foregoing treatments. In an embodiment of the invention, a coextruded film is treated on both surfaces, and in another embodiment a coextruded film is treated on one surface with a corona discharge and is flame treated on the other surface.

The pressure sensitive adhesive may be any solvent or emulsion based pressure sensitive adhesive such as acrylic or rubber based pressure sensitive adhesives. Typically, the adhesive is placed onto the film at a coat weight of about 10 to about 40, or from about 20 to about 25 grams/m$^2$. An example of a particularly useful adhesive is 52001 available from Avery Chemicals.

As described above, the films are useful in many shrink film applications. The films may be converted to a label by adding a pressure sensitive adhesive to the printable side of the film, e.g., the side with the soft polar additives. Print indicia may be placed onto the film prior to adding a pressure sensitive adhesive. The adhesive may be any of those known to those skilled in the art.

The labels of the present invention may be prepared by coextruding a skin layer, core layer and print layer such as those described above. This film is then printed by gravure printing and transfer laminated to a pressure sensitive adhesive on a release liner such as the silicone treated paper.

The labels are particularly useful in encapsulating articles such as, for example, batteries. By way of illustration, the above film is laminated to a pressure sensitive adhesive with liner. The film is die cut to form individual labels and the matrix surrounding the labels are removed. The resulting labels are then applied to a battery and then shrink wrapped in a heat tunnel. The temperature of the heat tunnel is approximately 250-260° F. The labels of the present invention encapsulate the battery as well without end puckering. When using these labels to encapsulate batteries, it is also understood that the labels may further include circuitry such as that used to determine the strength of the battery charge. Circuitry may be internal of the label, e.g., on the adhesive side of the label or on the outer surface of the label such as circuitry which would then be further covered with another film such as those described above, or a varnish to protect it from damage. Encapsulates for batteries and methods for encapsulating batteries along with description of some circuitry for battery labels is described in U.S. Pat. No. 5,190,609, issued to Lin et al. This patent in incorporated by reference for those teachings.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

Having thus described the invention, I claim:

1. A heat shrink film comprising:
a core layer having an upper surface and a lower surface, the core comprising a blend of (A) about 35% or less of an alpha-olefin copolymer comprising a copolymer of a ethylene or propylene and an alpha-olefin; (B) about 60% or more of a polyolefin; and (C) the balance being an olefin homopolymer;
a first skin layer disposed about the upper surface of the core layer; and
a second skin layer disposed about the lower surface of the core layer,
wherein at least one of the first and second skin layers comprises a glycol modified polyester, and
wherein the first and second skin layers have substantially the same shrinkage properties.

2. The heat shrink film of claim 1, where the core comprises from about 5 to about 35% of the alpha-olefin copolymer.

3. The heat shrink film of claim 1, wherein the core comprises from about 15 to about 30% of the alpha-olefin copolymer.

4. The heat shrink film of claim 1, wherein the core comprises about 20% of the alpha-olefin copolymer.

5. The heat shrink film of claim 1, wherein the alpha-olefin copolymer is a copolymer of (i) ethylene or propylene, and (ii) a $C_3$-$C_{12}$ alpha-olefin.

6. The heat shrink film of claim 1, wherein the alpha-olefin copolymer is a copolymer of (i) ethylene or propylene, and (ii) 1-butene or 1-hexene.

7. The heat shrink film of claim 1, wherein the polyolefin copolymer comprises a copolymer of ethylene and propylene.

8. The heat shrink film of claim 7, wherein the polyolefin copolymer has an ethylenic content of about 10% or less.

9. The heat shrink film of claim 1, wherein the core comprises from about 60 to about 90% by weight of the polyolefin copolymer.

10. The heat shrink film of claim 8, wherein the core layer comprises from about 60 to about 80% by weight of the polyolefin copolymer.

11. The heat shrink film of claim 1, wherein the olefin homopolymer is an ethylene homopolymer or a propylene homopolymer.

12. The heat shrink film of claim 10, wherein the core comprises from about 1 to about 30% by weight of the olefin homopolymer.

13. The heat shrink film of claim 12, wherein the core layers individually comprise a polyolefin, a polyester, a glycol modified polyester, or a combination of two or more thereof.

14. The heat shrink film of claim 1, wherein at least one of the skin layers is an adhesive layer.

15. The heat shrink film of claim 14, wherein at least one of the skin layers is printable.

16. The heat shrink film of claim 1, wherein the ratio of the thickness of core layer to the sum of the thickness of skin layers is from about 70:30 to about 90:10.

17. The heat shrink film of claim 1, wherein the ratio of the thickness of first skin layer to the sum of the thickness of core to the second skin layer is about 5-20:90-60:20-5.

18. The heat shrink film of claim 1 further comprising a tie layer disposed between the core layer and at least one of the skin layers.

19. An article encapsulated with the multilayer shrink film of claim 1.

20. The article of claim 19, wherein the article is a battery.

21. The heat shrink film of claim 1, wherein the glycol modified polyester is polyethylene terephthalate.

22. The heat shrink film of claim 1, wherein the first and the second skins have substantially the same composition.

23. The heat shrink film of claim 1, wherein the film has a shrinkage of at least about 30% determined at 270° F. by ASTM D 1204.

* * * * *